United States Patent
Prasannakumar et al.

(10) Patent No.: US 12,189,496 B2
(45) Date of Patent: Jan. 7, 2025

(54) METHOD AND SYSTEM FOR CROSS CLUSTER CONTAINER-BASED APPLICATION CLONING

(71) Applicant: Dell Products L.P., Round Rock, TX (US)

(72) Inventors: Pooja Prasannakumar, Bangalore (IN); William J. Elliott, IV, Holden, MA (US)

(73) Assignee: Dell Products L.P., Round Rock, TX (US)

(*) Notice: Subject to any disclaimer, the term of this patent is extended or adjusted under 35 U.S.C. 154(b) by 183 days.

(21) Appl. No.: 18/102,102

(22) Filed: Jan. 27, 2023

(65) Prior Publication Data
US 2024/0256396 A1   Aug. 1, 2024

(51) Int. Cl.
G06F 11/14   (2006.01)
G06F 11/30   (2006.01)

(52) U.S. Cl.
CPC ...... G06F 11/1469 (2013.01); G06F 11/1451 (2013.01); G06F 11/3051 (2013.01)

(58) Field of Classification Search
CPC ............. G06F 11/1469; G06F 11/1451; G06F 11/3051
See application file for complete search history.

(56) References Cited

U.S. PATENT DOCUMENTS

| | | | | |
|---|---|---|---|---|
| 11,200,207 B1* | 12/2021 | Lew | | G06F 11/1451 |
| 2015/0066850 A1* | 3/2015 | Oliver | | G06F 12/02 |
| | | | | 707/620 |
| 2017/0262346 A1* | 9/2017 | Pradhan | | G06F 3/0647 |
| 2022/0012134 A1* | 1/2022 | Chatterjee | | G06F 11/1469 |
| 2022/0309031 A1* | 9/2022 | Marelas | | G06F 3/067 |
| 2022/0398092 A1* | 12/2022 | Rangarao | | G06F 9/45558 |
| 2023/0229354 A1* | 7/2023 | Pabón | | G06F 3/0604 |
| | | | | 711/154 |
| 2024/0012717 A1* | 1/2024 | Mitkar | | G06F 11/1458 |
| 2024/0202019 A1* | 6/2024 | Jigalur | | G06F 9/45558 |
| 2024/0256562 A1* | 8/2024 | Prasannakumar | | G06F 16/24575 |

OTHER PUBLICATIONS

J. Watada, A. Roy, R. Kadikar, H. Pham and B. Xu, "Emerging Trends, Techniques and Open Issues of Containerization: A Review," in IEEE Access, vol. 7, pp. 152443-152472, 2019 (Year: 2019).*

* cited by examiner

Primary Examiner — Kamini B Patel
Assistant Examiner — Indranil Chowdhury
(74) Attorney, Agent, or Firm — Terrile, Cannatti & Chambers, LLP; Emmanuel A. Rivera

(57) ABSTRACT

Described are system and methods that provide for backing up a source cluster of a container-based application to a target cluster, using an intermediate store accessible by the source cluster and target cluster. The target cluster is registered and the container-based application is identified. Configuration and data of the container-based application is collected and written to intermediate store. A command identifying the target cluster to the intermediate store, which is read. If the identifier in the command and the identifier for the target are the same, a restore is performed to the target cluster.

20 Claims, 4 Drawing Sheets

METHOD AND SYSTEM FOR CROSS CLUSTER CONTAINER-BASED APPLICATION CLONING

BACKGROUND OF THE INVENTION

Field of the Invention

The present invention relates to container-based applications running on information handling systems. More specifically, embodiments of the invention provide for cloning of container-based applications across air-gapped clusters, using an intermediate store.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An emerging technology is container orchestration ecosystems employing container platforms, such as Kubernetes. Container orchestration ecosystems provide containers, where a container is a standard package of software, bundling application code along with configuration files and libraries. The use of container-based applications allows the ability to deploy applications seamlessly across various environments (e.g., information handling systems). Container platforms include clusters, which include a set of nodes or "machines." The nodes can include master and worker nodes that run containerized applications.

Given the ephemeral nature of container orchestration ecosystems, such as Kubernetes, having container-based applications available is important. To provide consistent availability of container-based applications, data and configuration of clusters of container-based applications are replicated to other clusters. In some instances, the clusters use different hardware. Such a backup provides copies of a container-based application to be brought up without loss of data or state in different cluster, especially if the original cluster is not available. This also allows copies of the container-based application to be brought up on other clusters often with point-in-time copies of the container-based application data for purposes such as analytics, debugging etc. Moving or cloning container-based applications from a source cluster to a target requires moving the configuration of the container-based application as well as the container-based application data from the source cluster to the target cluster.

Depending on the purpose of which workload is being moved or cloned, the target cluster could be in the same or different network as the source cluster. For example, if the workload is being cloned for the purpose of debugging, the target cluster could be in the same network. If the workload is being moved for disaster recovery or analytics, the target cluster could be at a site that is not accessible over the network from the source cluster. A cluster (e.g., source cluster, target cluster) can be in a public cloud while the other cluster is on-premises, or both clusters could be in two different public clouds. A problem is that once the container-based application configuration and data are backed up from the source cluster, if the target cluster is not network accessible from the source cluster, a restore from the backup cannot occur on the target cluster.

SUMMARY OF THE INVENTION

A computer-implementable method, system and computer-readable storage medium for backing up a source cluster of a container-based application to a target cluster using an intermediate store comprising registering the target cluster; identifying the container-based application; collecting configuration and data of the container-based application; writing the configuration and data of the container-based application to the intermediate store; writing a command identifying the target cluster to the intermediate store; reading the command identifying the target cluster from the intermediate store; and performing a restore to the target cluster of the container-based application if the command identifying the target cluster matches identifier of the target cluster.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Moving container-based applications from one source cluster to another target cluster involves moving the configuration of the container-based application from the source cluster to target cluster, as well as moving the container-based application data from a storage array backing the original source cluster to the storage array backing the target cluster. The container-based application can then be brought up on the target cluster using the configuration and data that was moved.

Described herein are implementations that use an intermediate storage or object store location, accessible by clusters (e.g., source clusters, target clusters). Configuration and data of the container-based application are copied to the intermediate storage or object store location, before being restored to a target cluster. This unique use of an intermediary unlocks additional mobility scenarios. Different workloads can be supported, such as debugging disaster recovery, analytics, etc. The target cluster could be in the same or different network as the source cluster. A cluster (e.g., source cluster, target cluster) can be in a public cloud while the other cluster is on-premises, or both clusters could be in two different public clouds.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
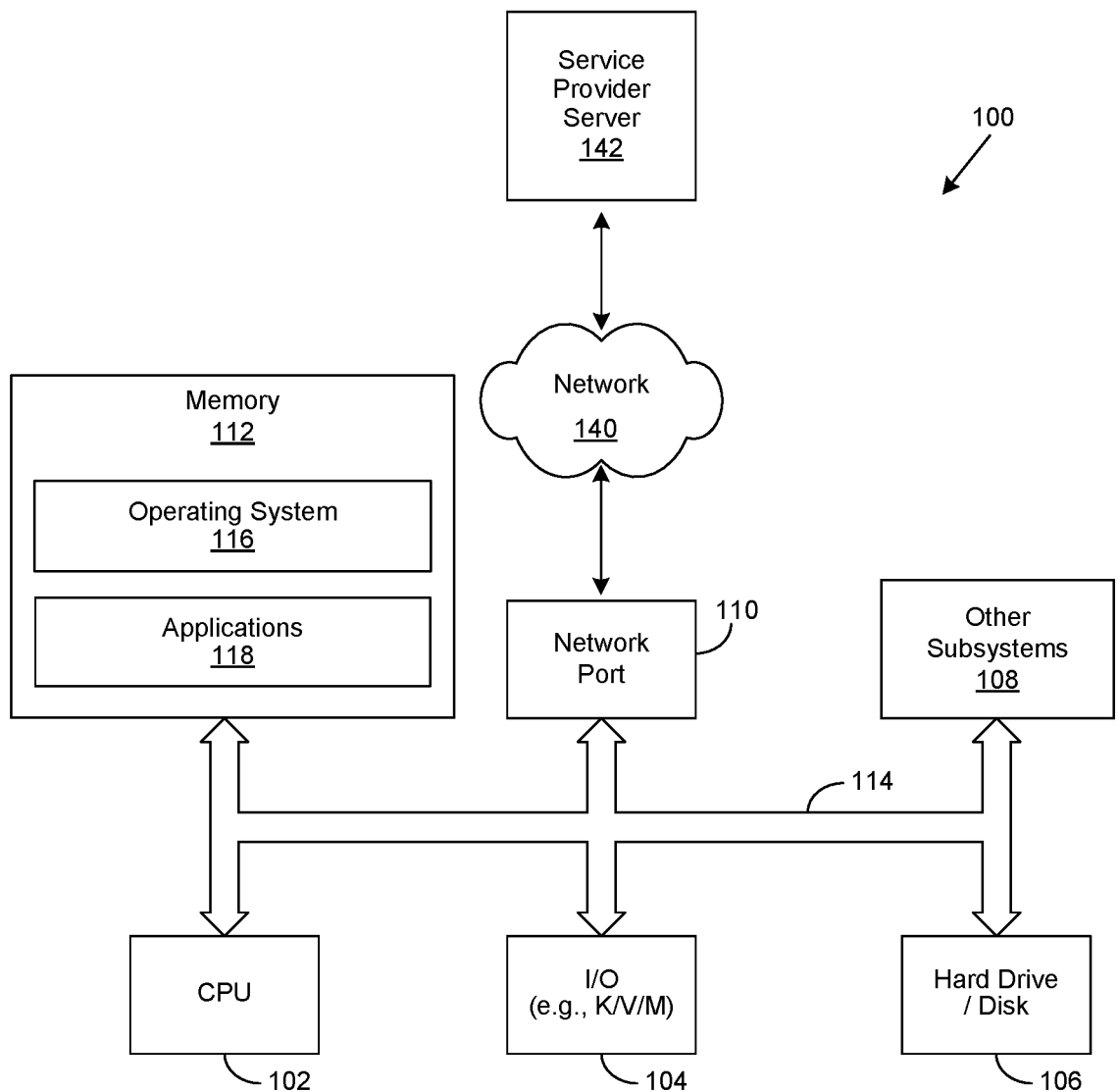
FIG. 1 is a general illustration of components of an information handling system as implemented in the present invention.

FIG. 1 is a generalized illustration of an information handling system (IHS) 100 that can be used to implement the system and method of the present invention. The information handing system (IHS) 100 can be a host to the peripheral devices described herein.

The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (HS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116, and one or more application(s) 118.

Figure 2:
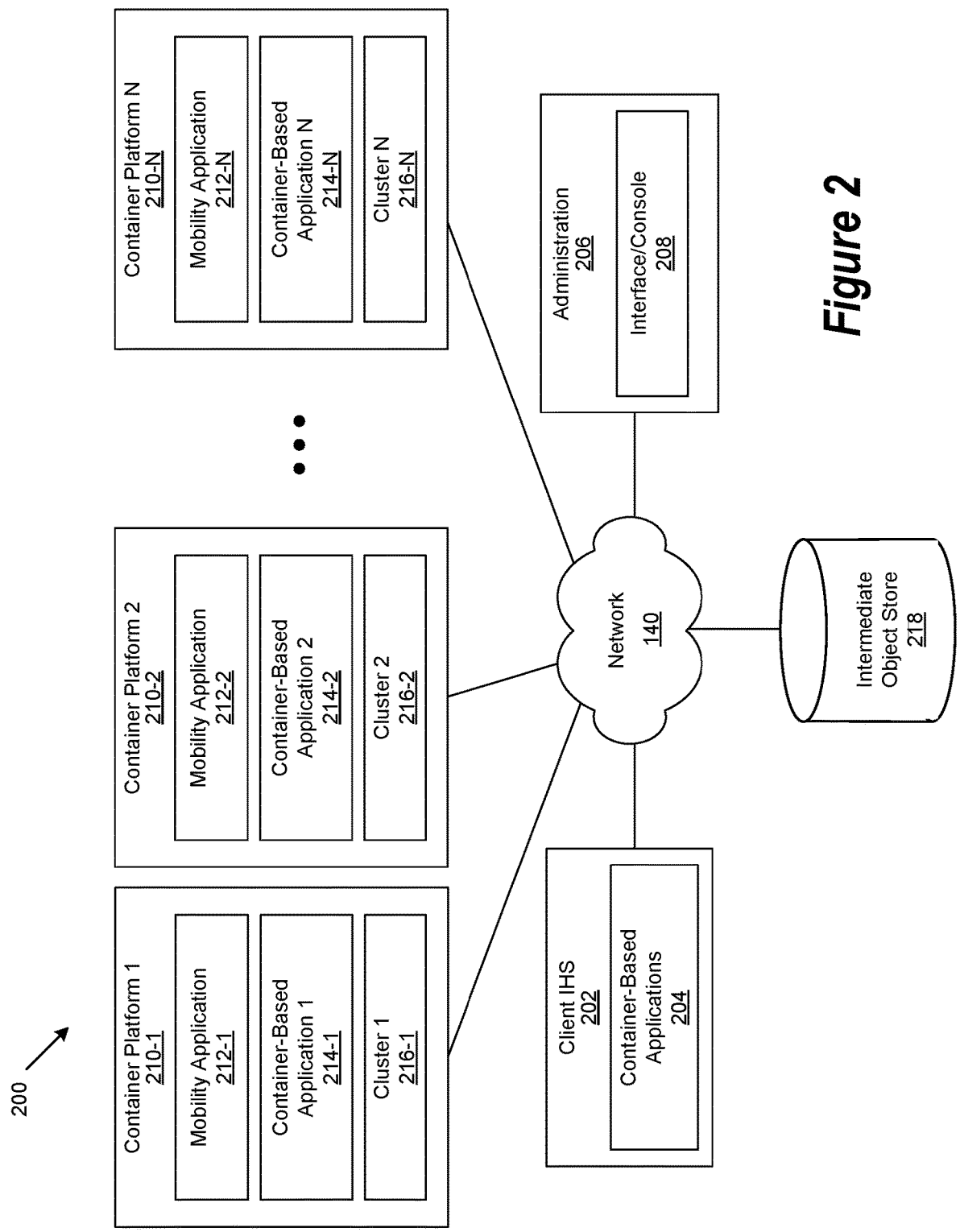
FIG. 2 illustrates a system as implemented in the present invention.

FIG. 2 illustrates a system 200 for replication and moving data to provide container-based application mobility. The system 200 represents a container orchestration ecosystem, such as systems based using Kubernetes. In certain implementations, one or more client information handling systems, represented as client IHS 202 are included in the system 200. The client IHS 202 can be embodied as an IHS 100 as described in FIG. 1. It is understood that that the client IHS 202 is not necessary to the invention, and is described in context as to the use of container-based applications 204.

Implementations provide for client IHS 202 to include container-based applications 204, which can be container images or containers. A container image is a lightweight, standalone, executable package of software that includes what is used to run an application (i.e., include container-based applications 204), such as code, runtime, system tools, system libraries, and settings. Container images are used to instantiate containers at application runtime. The container image(s) or container(s) are designed to be standardized to be portable and secure, and lightweight to allow the ability to use or share an operating system of the client IHS 202. Client IHS 202 is connected to network 140, where network 140 as described in FIG. 1, includes one or more wired and wireless networks, including the Internet. Network 140 connects HIS 202 with other elements of system 200 as described herein.

In various implementations, the system 200 further can include an administration element 206 which includes an interface/console 208 to access/communicate with client IHS 202. The administration element 206 is accessible by a user, such as an administrator or IT personnel. It is understood that that the client administration element 206 is not necessary to the invention, and is described in context.

The system 200 further can include multiple container platforms represented by container platforms 210-1 to 210-N. Implementations provide for the container platforms 210 to be Kubernetes based. Each container platform 210 is accessible to other container platforms 210, the client IHS 202, and the administration element 206. The container platforms 210 can be located on the same physical sites/networks, or in different sites/networks, including cloud networks (i.e., public/private cloud networks).

Each container platform 210 includes a mobility application controller or mobility application 212, container-based application 214, cluster 216. Various implementations further provide for the container platforms 210 include or access to persistent storage (not shown), which can include volumes and arrays (not shown) for container-based application 214 and cluster 216. The container-based applications 214 are provided to client IHS 202 and stored as container-based applications 204.

The system 200 further includes an intermediate or object store 218 accessible by the other elements of system 200. In particular, the intermediate or object store 218 is accessible by all the container platforms 210.

Implementations herein provide for when the platforms 210 and administration element 206 are not able to communicate with one another, i.e., not connected/provide data and information to one another; however, clusters 216 and their components communicate with the intermediate object store 218.

Figure 3:
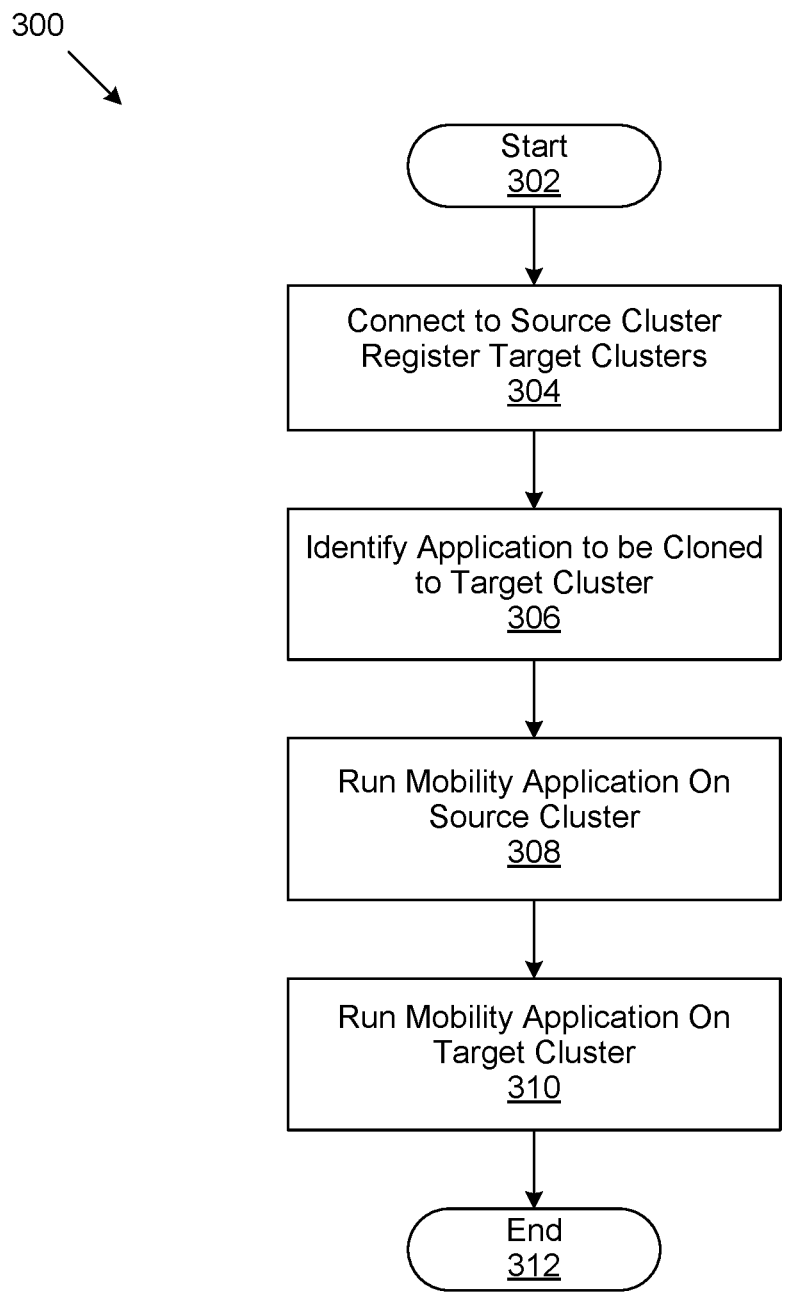
FIG. 3 is a generalized flowchart for cross cluster cloning of container-based applications using an intermediate store.

FIG. 3 shows a cross cluster cloning of container-based applications using an intermediate store. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention. For example, implementations provide for the described system 200 of FIG. 2, to perform the process 300 and the steps described herein. In particular, mobility applications 212 can be implemented to perform steps of process 300.

At step 302, the process 300 starts. At step 304, connection is performed to a source cluster. For example, the connection can be through administration element 206. The source cluster can be cluster 1 216-1. One or more target clusters can be registered. For example, cluster 2 216-2 and cluster N 216-N can be registered as target clusters. The registration can be as to source and target pair (e.g., source cluster 216-1, target cluster 216-2). Registration need only take places once for each source and target pair.

At step 306, identification is performed as to a container-based application to be cloned to a target cluster. The identification can be through the administration element 206. In this example, container-based application 214-1 is identified. Identification can be using namespace or labels as to the container-based application (i.e., container-based application 214-1).

At step 308, mobility application of the source platform (i.e., mobility application 212-1) copies the application data and configuration to intermediate store and runs the following. Container-based application 1 214-1 configuration is collected which includes namespaces, deployments, services, pods, persistent volume claims and other resources matched by namespace or labels as identified in step 306. Discovery is performed as to volumes used by container-based application 1 214-1. The Container-based application 1 214-1 configuration is backed up and persisted/written to the intermediate object store 218. Data of the container-based application 1 214-1 is backed up from volumes using appropriate data movers by copying the data to intermediate object store 218 or directly to a backing array of the target when replication is used a data mover. An object or command is written to the intermediate object store 218 indicating which cluster (i.e., target cluster 216-2) the container-based application 1 214-1 is to be cloned to and what backup to use. The target cluster can be identified by an identifier.

At step 310, the mobility application of the target platform (i.e., mobility application 212-2) copies application data and configuration from the intermediate store and runs the following. Periodical reads are performed regarding backups and other objects from the intermediate object store 218. When a read is performed as to the backups and other objects from the intermediate object store 218 which indicate which target cluster (e.g., cluster 2 216-2) to restore to, the mobility application (e.g., mobility application 212-2) compares the cluster identifier mentioned in object or command as described in step 308, with identifier of the target cluster (e.g., cluster 2 216-2). If the cluster identifiers match, the mobility application (e.g., mobility application 212-2) triggers a restore on the target cluster (e.g., cluster 2 216-2) from the specified backup. Once the restore is orchestrated to completion by the mobility applications (e.g., mobility applications 212-1 and 212-2), clone of the container-based application (container-based application 1 214-1) can be available on the target cluster (e.g., cluster 2 216-2). Status or results of the restore is written to the intermediate object store 218. The mobility application (e.g., mobility application 212-1) of the source cluster/source container platform (e.g., cluster 1 216-1/container platform 210-1) can periodically read the status or result of the restore written to the intermediate object store 218. If the target identifiers do not match, the mobility application (e.g., mobility application 212-2) of the target cluster/source container platform (e.g., cluster 2 216-2/container platform 210-2) ignores the command. At step 312, the process 300 ends.

Figure 4:
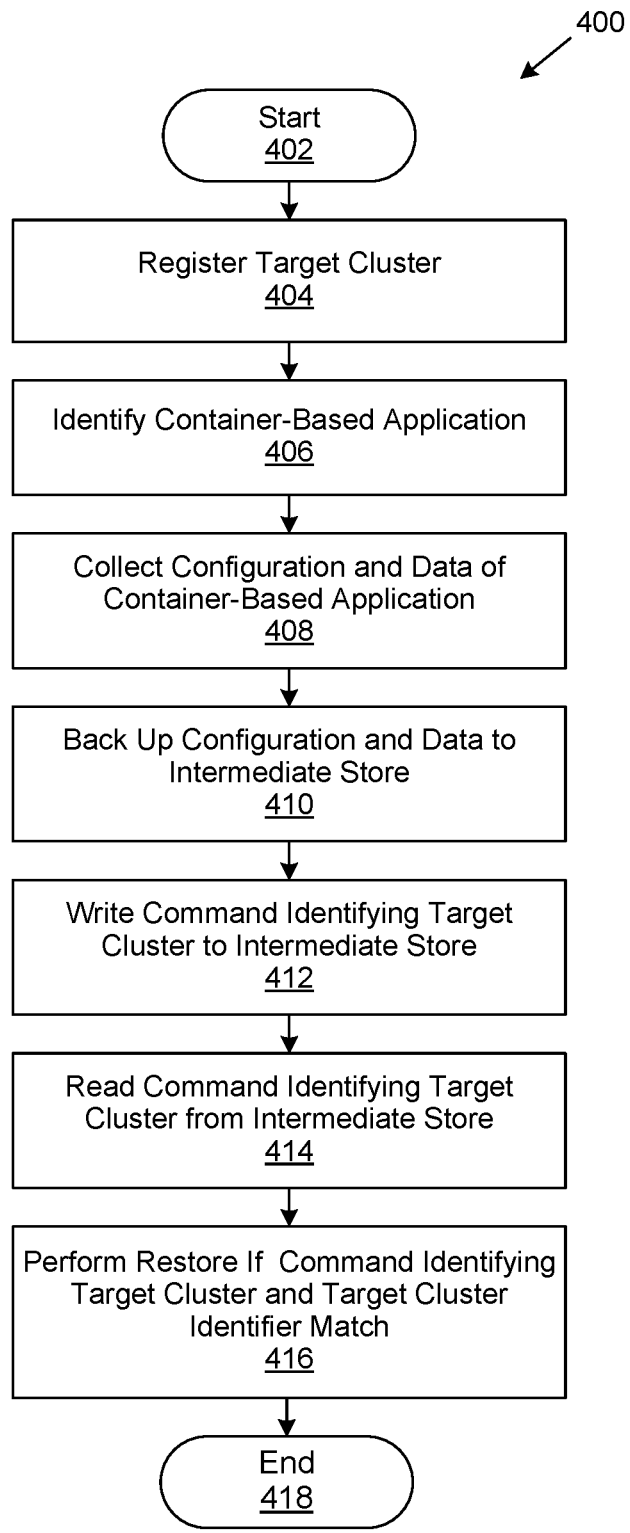
FIG. 4 is a generalized flowchart for backing up a source cluster of a container-based application to a target cluster using an intermediate store.

FIG. 4 shows a generalized flowchart for backing up a source cluster of a container-based application to a target cluster using an intermediate store. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention. For example, implementations provide for the described system 200 of FIG. 2, to perform the process 400 and the steps described herein. In particular, mobility applications 212 can be implemented to perform steps of process 400.

At step 402, the process 400 starts. At step 404, registering the target cluster is performed. For example, cluster 2 216-2 and cluster N 216-N can be registered as target clusters. The registration can be as to source and target pair (e.g., source cluster 216-1, target cluster 216-2). Registration need only take places once for each source and target pair.

At step 406, identification is performed as to a container-based application to be cloned to a target cluster. The identification can be through the administration element 206. In this example, container-based application 214-1 is identified. Identification can be using namespace or labels as to the container-based application (i.e., container-based application 214-1).

At step 408, container-based application 1 214-1 configuration and data are collected which includes namespaces, deployments, services, pods, persistent volume claims and other resources matched by namespace or labels as identified in step 306. Discovery is performed as to volumes used by container-based application 1 214-1.

At step 410, configuration and data of container-based application (i.e., container-based application 214-1) are backed up and persisted/written to the intermediate object store 218. Data of the container-based application 1 214-1 is backed up from volumes using appropriate data movers by copying the data to intermediate object store 218 or directly to a backing array of the target when replication is used a data mover.

At step 412, object or command is written to the intermediate object store 218 indicating which cluster (i.e., target cluster 216-2) the container-based application 1 214-1 is to be cloned to and what backup to use. The target cluster can be identified by an identifier.

At step 414, periodical reads are performed regarding objects or commands backups from the intermediate object store 218. An object or command is read identifying the target cluster of step 412.

At step 416, a restore to the target cluster is performed if the identifier in the object or command matches the identifier of the target cluster (e.g., cluster 2 216-2). At step 418, the process 400 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for backing up a source cluster of a container-based application to a target cluster using an intermediate store comprising:
   registering the target cluster;
   identifying the container-based application;
   collecting configuration and data of the container-based application;
   writing the configuration and data of the container-based application to the intermediate store;
   writing a command identifying the target cluster to the intermediate store;
   reading the command identifying the target cluster from the intermediate store; and
   performing a restore to the target cluster of the container-based application if the command identifying the target cluster matches identifier of the target cluster.

2. The computer-implementable method of claim 1, wherein the source cluster and target are at different networks or sites.

3. The computer-implementable method of claim 1, wherein the source cluster writes to the intermediate store and the target cluster reads from the intermediate store.

4. The computer-implementable method of claim 1, wherein the identifying the container-based application is by namespace or label.

5. The computer-implementable method of claim 1, wherein the configuration includes namespaces, deployments, services, pods, persistent volume claims and other resources.

6. The computer-implementable method of claim 1, wherein the writing the command further comprises writing which back up to use for restore.

7. The computer-implementable method of claim 1 further comprising providing status or results of the restore to the intermediate store.

8. A system comprising:
   a plurality of processing systems communicably coupled through a network, wherein the processing systems include non-transitory, computer-readable storage medium embodying computer program code interacting with a plurality of computer operations for backing up a source cluster of a container-based application to a target cluster using an intermediate store comprising:
registering the target cluster;
identifying the container-based application;
collecting configuration and data of the container-based application;
writing the configuration and data of the container-based application to the intermediate store;
writing a command identifying the target cluster to the intermediate store;
reading the command identifying the target cluster from the intermediate store; and
performing a restore to the target cluster of the container-based application if the command identifying the target cluster matches identifier of the target cluster.

9. The system of claim 8, wherein the source cluster and target are at different networks or sites.

10. The system of claim 8, wherein the source cluster writes to the intermediate store and the target cluster reads from the intermediate store.

11. The system of claim 8, wherein the identifying the container-based application is by namespace or label.

12. The system of claim 8, wherein the configuration includes namespaces, deployments, services, pods, persistent volume claims and other resources.

13. The system of claim 8, wherein the writing the command further comprises writing which back up to use for restore.

14. The system of claim 8 further comprising providing status or results of the restore to the intermediate store.

15. A non-transitory, computer-readable storage medium embodying computer program code for backing up a source cluster of a container-based application to a target cluster using an intermediate store, the computer program code comprising computer executable instructions configured for:
registering the target cluster;
identifying the container-based application;
collecting configuration and data of the container-based application;
writing the configuration and data of the container-based application to the intermediate store;
writing a command identifying the target cluster to the intermediate store;
reading the command identifying the target cluster from the intermediate store; and
performing a restore to the target cluster of the container-based application if the command identifying the target cluster matches identifier of the target cluster.

16. The non-transitory, computer-readable storage medium of claim 15, wherein the source cluster and target are at different networks or sites.

17. The non-transitory, computer-readable storage medium of claim 15, wherein the source cluster writes to the intermediate store and the target cluster reads from the intermediate store.

18. The non-transitory, computer-readable storage medium of claim 15, wherein the identifying the container-based application is by namespace or label.

19. The non-transitory, computer-readable storage medium of claim 15, wherein the configuration includes namespaces, deployments, services, pods, persistent volume claims and other resources.

20. The non-transitory, computer-readable storage medium of claim 15, further comprising providing status or results of the restore to the intermediate store.

\* \* \* \* \*